United States Patent [19]

Steimer

[11] Patent Number: 5,187,652
[45] Date of Patent: Feb. 16, 1993

[54] TURN-OFF CIRCUIT

[75] Inventor: Peter Steimer, Schleinikon, Switzerland

[73] Assignee: Asea Brown Boveri Ltd., Baden, Switzerland

[21] Appl. No.: 797,911

[22] Filed: Nov. 26, 1991

[30] Foreign Application Priority Data

Dec. 10, 1990 [EP] European Pat. Off. ........ 90123735.4

[51] Int. Cl.[5] ............................................. H02M 5/44
[52] U.S. Cl. ..................................... 363/37; 363/138; 318/254; 318/811
[58] Field of Search ..................... 363/37.51, 135–138; 318/254, 802, 810, 811

[56] References Cited

U.S. PATENT DOCUMENTS 3,887,862 6/1975 Hübner .
4,358,811 11/1982 Arremann ...................... 363/135 X Primary Examiner—Emanuel T. Voeltz
Attorney, Agent, or Firm—Burns, Doane, Swecker & Mathis

[57] ABSTRACT

In circuits with self-commutation such as, for example in inverters (4) for feeding an asynchronous machine (7), a short-time turn-off current impulse is taken from a turn-off capacitor (C1) of a turn-off or common turn-off circuit (3) for interrupting the thyristor current of the inverter. The turn-off circuit (3) connected to the direct-current side (8, 9) of the inverter (4) exhibits a first series circuit of the turn-off capacitor (C1) and a first electrical valve (T2, D2). In a branch in parallel with the turn-off capacitor (C1), a ring-around reactor (L1) with an inductance of 0.1 mH is connected in series with a second thyristor (T1). A further third thyristor (T3) is connected in antiparallel with the second thyristor (T1). A ring-around process initiated by the firing of the second thyristor (T1) is interrupted after a half period. After a freely selectable time, the third thyristor (T3) can be fired and the full resonance cycle can be concluded. As a result, the hold-off interval or minimum turn-off period for the thyristors can be achieved with a comparatively very small ring-around reactor (L1).

8 Claims, 1 Drawing Sheet

TURN-OFF CIRCUIT

BACKGROUND OF THE INVENTION

1. Field of the Invention

The invention is based on a turn-off circuit for a circuit having at least one self-commutated electrical valve according to the preamble of claim 1.

2. Discussion of Background

The preamble of the invention refers to a prior art which is known from EP-B1-0 161 738. In this specification, a common turn-off device is specified which is connected in parallel with the inverter of a converter on the direct-current side. To turn-off the inverter, the load current is commutated to the turn-off circuit. This applies a counter voltage to the inverter which turns off the current to the inverter. The turn-off circuit exhibits a series circuit of a diode and a turn-off capacitor. A ring-around reactor is connected in series with a thyristor in a parallel branch to the turn-off capacitor. A diode is connected in antiparallel with this thyristor.

In this common turn-off device, the hold-off interval or minimum turn-off period of the inverter thyristors is permanently set by the ring-around period of the common turn-off device, that is to say by the magnitude of the inductance of the ring-around reactor.

SUMMARY OF THE INVENTION

The invention as defined in claim 1 achieves the object of further developing a turn-off circuit for a circuit having at least one self-commutated electrical valve of the type initially mentioned in such a manner that the turn-off period of the at least one self-commutated valve becomes variably adjustable.

An advantage of the invention consists in that the ring-around reactor can be dimensioned to be much smaller as a result of which the volume of the turn-off circuit is reduced. The dimensioning of the turn-off circuit is simpler.

The ring-around process can be broken off after one half period. After a freely selectable time, a second valve can be turned on and, as a result, the full resonant cycle completed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
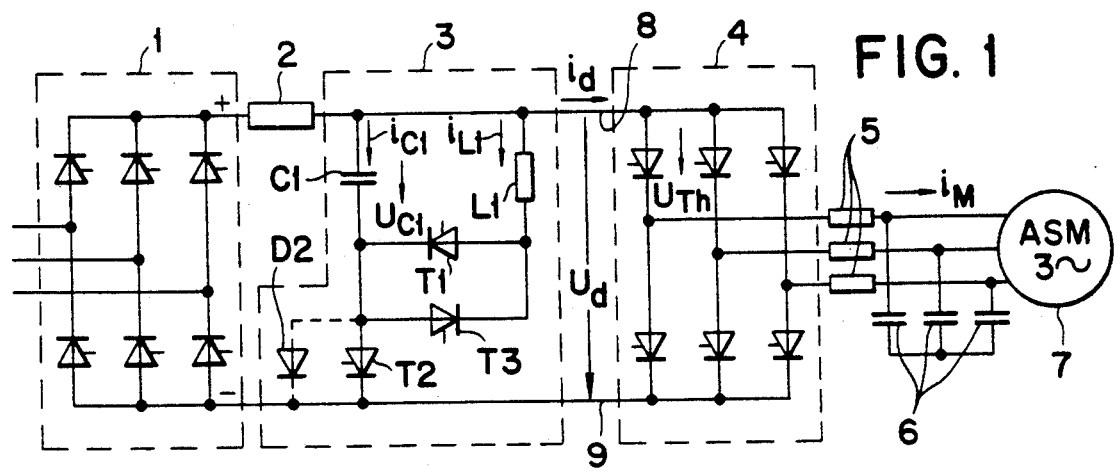
FIG. 1 shows a block diagram of a converter for feeding a three-phase alternating-current machine with a direct-current link circuit and a turn-off circuit for an inverter of the converter.

Referring now to the drawings, wherein like reference numerals designate identical or corresponding parts throughout the several views, in FIG. 1, (1) designates a three-phase bridge rectifier which is connected at the direct-current end via a link circuit reactor (2) and a common turn-off circuit or turn-off circuit (3) to an inverter (4) in a three-phase bridge circuit. The rectifier (1), link circuit reactor (2), turn-off circuit (3) and inverter (4) together form a converter which is connected at its alternating-current output via three load or commutating reactors (5) and three load capacitors (6) in a star circuit for compensating harmonics to a motor or to an alternating-current machine or a three-phase asynchronous machine (7).

The reference symbol (8) designates a positive feed terminal, and the reference symbol (9) designates a negative feed terminal, of the turn-off circuit (3) and, at the same time, of the inverter (4) which has thyristors in its bridge branches.

($U_{Th}$) designates a thyristor voltage and ($i_M$) a load or motor or machine current.

The turn-off circuit (3), which is connected in parallel with the inverter (4) at the direct-current end exhibits a first series circuit of a turn-off capacitor (C1) and a thyristor (T2) which is connected at the cathode end to the negative feed terminal (9). In a parallel branch to the turn-off capacitor (C1), a series circuit of an inductive resistance or a ring-around reactor (L1) and a controllable electrical valve or thyristor (T1), the cathode end of which is connected to the anode of the thyristor (T2), is provided. A thyristor (T3) is connected in antiparallel with the thyristor (T1). Instead of the thyristor (T2), a diode (D2) can be provided, particularly with a low link-circuit voltage ($U_d$) as indicated with dashed lines.

The present converter is designed, for example for a link-circuit voltage ($U_d$) of 2.4 kV and a link-circuit current ($i_d$) of 840 A. The capacitance of the turn-off capacitor (C1) is 133 $\mu$F and the inductance of the ring-around reactor (L1) is 0.1 mH. An average machine current ($i_M$) is 560 A.

Figure 2:
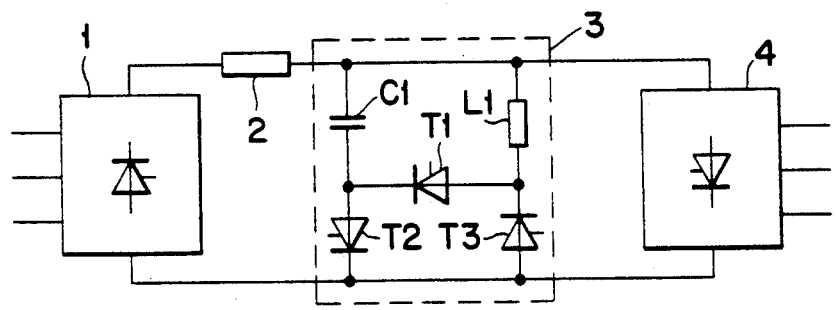
FIG. 2 shows a converter according to FIG. 1 but with a different turn-off circuit for the inverter.

Instead of connecting the thyristor (T3) in antiparallel with the thyristor (T1), it can also be connected together with the thyristor (T2) in a parallel branch to the thyristor (T1), the cathode of the thyristor (T2) being connected to the anode of the thyristor (T3), compare FIG. 2. In the circuit according to FIG. 2, too, a diode (D2) (not shown) can be provided instead of the thyristor (T2) as in the preferred embodiment of FIG. 1.

Figure 3:
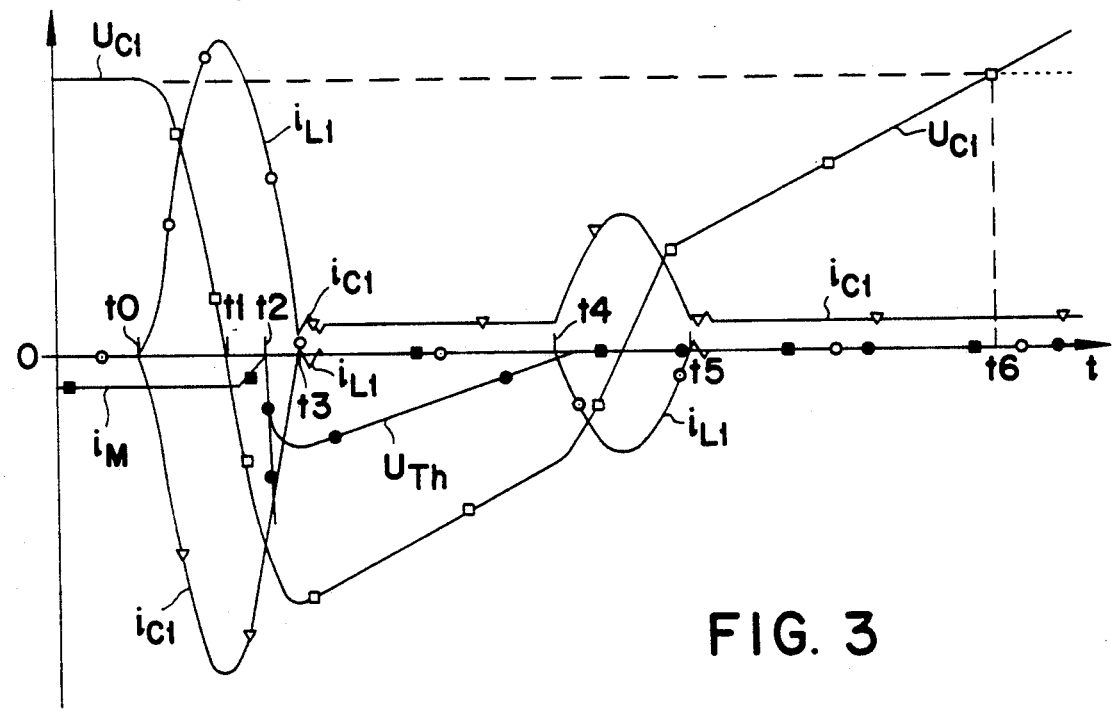
FIG. 3 shows a signal diagram of currents and voltages for explaining the effect of the turn-off circuits according to FIGS. 1 and 2.

In the text which follows, the identical effect of the two turn-off circuits (3) according to FIGS. 1 and 2 is explained with reference to FIG. 3. In this Figure, a voltage (U) and a current (i) are plotted along the ordinate and the time (t) is plotted along the abscissa in arbitrary units. The curves shown have been obtained by means of a computer simulation.

Before a time (t0), the turn-off capacitor (C1) is charged up to a turn-off capacitor voltage ($U_{c1}$) equal to the link circuit voltage ($U_d$) without a capacitor current ($i_{C1}$) flowing. The inverter (4) conducts current at a thyristor voltage ($U_{Th}$)=0 and a machine current ($i_M$)=560 A. At time (t0), a turn-off instruction comes from a higher-level device, not shown, to the turn-off circuit (3) for turning off the inverter (4). At this time (t0), the thyristor (T1) is fired so that an increase in reactor current ($i_{L1}$) begins to flow through the ring-around reactor (L1) and a capacitor current ($i_{C1}$) which is negative with respect to the direction of the arrow drawn in FIG. 1 begins to flow which recharges the turn-off capacitor (C1).

Shortly after a time (t1) of voltage reversal at the turn-off capacitor (C1), the thyristor (T2) is fired so that the thyristors of the inverter (4) receive a counter current and become currentless at a time (t2) following shortly thereafter. At a later time (t3), both the capacitor current ($i_{C1}$) and the reactor current ($i_{L1}$) become=0 so that the thyristor (T1) becomes currentless, changes to its off state and thus blocks the ring-around process. This is followed by a steady recharging of the turn-off capacitor (C1) via the link circuit reactor (2) and the current-carrying thyristor (T2) with a constant capacitor current ($i_{C1}$).

At a time (t4) predeterminable by a higher-level device the thyristor (T3) is fired, which means that the inverter (4) is to be turned on. After that, the ring-around process of the turn-off capacitor (C1) is ended by a time (t5). At time (t5), the thyristor (T3) turns off due to its current passing through zero so that the ring-around process stops. After that, the turn-off capacitor (C1) continues to be steadily charged up as in the time interval between (t3) and (t4). The inverter (4) is usually turned on again at a time (t6) so that the capacitor voltage ($U_{cl}$) can no longer rise and stops at the value before the time (t0) as indicated by the dotted line.

Naturally, the converter (2–4) can also be constructed to run in, for example, 12-pulse mode instead of in 6-pulse mode. Instead of a turn-off capacitor (C1), a capacitor bank can be provided. With a correspondingly high link-circuit voltage, several capacitors and valves can be connected in series.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A turn-off circuit for a circuit having a self-commutated electrical valve comprising:
   a) a positive feed terminal and a negative feed terminal;
   a first series circuit including a turn-off capacitor and a first electrical valve, a first terminal of said turn-off capacitor being connected to said positive feed terminal and an anode of said first electrical valve being connected to a second terminal of said capacitor such that said first series circuit is connected directly to the positive and negative feed terminals;
   c) a second series circuit including an inductor and a controllable second electrical valve in a branch in parallel with the turn-off capacitor, a negative potential side of said second electrical valve being connected to the anode of the first electrical valve such that said turn-off capacitor and said negative potential side of said second electrical valve are connected to said negative feed terminal via said first electrical valve; and
   d) a controllable third electrical valve provided in a branch in parallel with the second electrical valve, a direction of current flow of the third electrical valve being opposite to that of the second electrical valve.

2. Turn-off circuit as claimed in claim 1, wherein the third electrical valve is connected in series with the first electrical valve, in such a manner that a cathode of the first electrical valve is operatively connected to an anode of the third electrical valve.

3. Turn-off circuit as claimed in claim 1, wherein the first to third electrical valves are thyristors.

4. Turn-off circuit as claimed in claim 2, wherein the first to third electrical valves are thyristors.

5. Turn-off circuit as claimed in claim 1, wherein the first electrical valve is a diode, and the second and third electrical valves are thyristors.

6. Turn-off circuit as claimed in claim 2, wherein the first electrical valve is a diode, and the second and third electrical valves are thyristors.

7. A turn-off circuit for an inverter having at least one forced-commutated electric valve which is connected to a direct voltage source via a link reactor, comprising:
   a) a first series circuit including a turn-off capacitor and a first electric valve, said first series circuit being connected directly parallel to the at least one forced-commutated electric valve and being connected directly parallel to the direct voltage source via the link reactor;
   b) a first branch parallel to the turn-off capacitor, said first branch including a second series circuit comprising at least one inductor and a controllable second electric valve, said turn-off capacitor and a negative potential side of the second electric valve being connected to an anode of the first electrical valve; and
   c) a second branch parallel to the second electric valve, said second branch including a controllable third electric valve which is connected antiparallel to the controllable second electric valve.

8. The turn-off circuit of claim 7, wherein the third electric valve is connected in series with the first valve such that a cathode of the first electric valve is connected directly to an anode of the third electric valve, and a cathode of the third electric valve is connected to an anode of the first electric valve via the controllable second electric valve.

* * * * *